United States Patent
Weiner

(10) Patent No.: US 6,671,732 B1
(45) Date of Patent: Dec. 30, 2003

(54) METHOD AND APPARATUS FOR CONTROL OF CONTENT BASED RICH MEDIA STREAMING

(75) Inventor: Moshe Weiner, Kiron (IL)

(73) Assignee: Comverse Ltd., Tel Aviv (IL)

( * ) Notice: Subject to any disclaimer, the term of this patent is extended or adjusted under 35 U.S.C. 154(b) by 574 days.

(21) Appl. No.: 09/624,350

(22) Filed: Jul. 24, 2000

(51) Int. Cl.[7] .............................................. G06F 15/16
(52) U.S. Cl. ..................................... 709/231; 709/232
(58) Field of Search ................................ 709/217, 219, 709/224, 226, 231, 232, 223; 455/423, 424, 425, 452, 466, 552, 553; 725/95, 96, 91, 114, 116

(56) References Cited

U.S. PATENT DOCUMENTS

| | | | | |
|---|---|---|---|---|
| 5,611,038 A | * | 3/1997 | Shaw et al. ................. | 395/806 |
| 6,014,694 A | * | 1/2000 | Aharoni et al. ............. | 709/219 |
| 6,088,732 A | * | 7/2000 | Smith et al. ................ | 709/229 |
| 6,128,649 A | * | 10/2000 | Smith et al. ................ | 709/217 |
| 6,384,821 B1 | * | 5/2002 | Borrel et al. ............... | 345/421 |
| 6,493,546 B2 | * | 12/2002 | Patsiokas ................. | 455/277.1 |

* cited by examiner

*Primary Examiner*—Dung C. Dinh
*Assistant Examiner*—Kimberly Flynn
(74) *Attorney, Agent, or Firm*—Sughrue Mion, PLLC

(57) ABSTRACT

A method and apparatus for tagging rich media content so that receivers of electronic information on electronic networks can specify content preferences. The transmission of content is controlled by the setting of priorities by the user, according to different forms of content, and then the system deletes content beginning with that of lowest priority. Content can be deleted because of poor communications conditions, or proactively to effectively highlight aspects of the communicated information in conformance to the desires of the user. In particular, the invention anticipates the multimedia capabilities and transmission difficulties of emerging 3G wireless devices.

41 Claims, 6 Drawing Sheets

FIG. 6

| Segment's name | Lecturer speaking from his table | Lecturer drawing a graph | Lecturer Plays wild animal's sounds | Lecturer plays wild animal sounds – class video | Video tape about wild life | A slide presented by the lecturer | Explanation of the slide |
|---|---|---|---|---|---|---|---|
| Media Type | Video | Video | Audio | Video | Video | Image | Audio |
| Media Format | MPEG4 | MPEG4 | MP3 | MPEG4 | MPEG4 | GIF | MP3 |
| Content Tags | Talking Head | White board | Animal Sounds | Group of People | Scenery | Graph | Speech |
| Time of Beginning | 0:00:00 | 0:02:05 | 0:05:00 | 0:05:00 | 0:10:00 | 0:20:00 | 0:20:00 |
| End | 0:02:05 | 0:05:00 | 0:10:00 | 0:10:00 | 0:20:00 | 0:25:00 | 0:25:00 |

↓ Only audio      ↓ Only audio

 = delivered to the student

METHOD AND APPARATUS FOR CONTROL OF CONTENT BASED RICH MEDIA STREAMING

FIELD OF THE INVENTION

The present invention relates generally to the transmission of electronic information over an electronic network, and specifically to user control of the content of the information being received, and particularly when communication conditions are poor. Poor communication may result from network congestion, from transmission difficulties associated with the area from which the transmitting device operates, or from reception difficulties associated with the area in which the receiver operates. The transmission of the different forms of content is controlled in accordance with priorities set by the user, and the system is capable of deleting content under poor communication conditions beginning with that of lowest priority.

BACKGROUND OF THE INVENTION

Both portable and cellular telephones are becoming increasingly popular for portable telephone use, particularly for users who are interested in rapid, mobile communication. As computational power and memory space increases, a demand has arisen for additional communication services to be provided through such devices. Telephone users anticipate the availability a variety of multimedia information, including e-mail (electronic mail) messages, Web pages and even full-motion video, both for broadcasts and closed-circuit television.

Computer networks, such as the Internet, now carry data for multimedia applications, which are particularly latency-sensitive, or vulnerable to delay. For example, a delay experienced during the transmission of voice data interrupts the telephone conversation. In contrast, a delay in downloading a Web page is less problematic to the user. Conversely, voice transmission requires less bandwidth (bits per second) than receiving a Web page, for example, but does require an uninterrupted amount of bandwidth.

Rich media streaming involves various types of media such as audio, video, text, and/or images. Media streaming involves various network conditions with different bandwidths and delays. In streaming, a receiving device reproduces sound or video in real time as the signal is downloaded over the Internet, as opposed to storing the signal in a local file first. A plug-in to a Web browser, such as Netscape Navigator, decompresses and plays the data as it is transferred to a personal computer over the Internet. Streaming audio or video avoids the delay entailed in downloading an entire file and then reproducing it with a helper application. Streaming requires a fast connection and a computer with sufficient processing capability to execute the decompression algorithm in real-time.

Furthermore, various receiving terminals have different receiving capabilities. A wide usage of cellular handsets and an expected appearance of 3rd generation (3G) handsets with rich media receiving capabilities, are bringing the rich media flow control issue from the internet field into the cellular domain with added constraints due to reduced size, portability and wireless transmission. However, existing media flow control protocols deal only with technical parameters of data communication. Existing protocols do not address the general content characteristics within the information stream.

For example, if a user is watching a video message on a cellular handset, and suddenly enters an area with poor reception, not all the transmitted information is received. Transmission may include video such as a "talking head", video as scenery, audio, and animation such as a white board drawing. When the speaker is known, the user is likely to prefer to omit the talking head, preferring only to hear the audio, and more importantly, to see the white board. Like the laminated conference-room board, from which the name is derived, an electronic white board is used for collaborating on documents. Electronic white boards are programs that allow multiple users teleconferencing at remote computers to draw, write and erase, in turn, on the same document.

Another user, for example, is most interested in seeing the face of the speaker, and in the case where some information is preferably relinquished, prefers to give up the background scenery video. The need for such content based flow control is being created by the convergence of electronic networks with small, portable, wireless devices that simply can not deliver all the media information all of the time. Existing Quality of Service (QoS) protocols are based on a request of priority, e.g. Resource Reservation Protocol (RSVP), that allows channels or paths on the Internet to be reserved for the multicast transmission of video and other high-bandwidth messages. However, prioritizing is not a solution since such a request only makes the network more congested by sending more information through the network. Each RSVP node sends periodic RSVP messages for each existing RSVP session. The overhead due to such periodic state refreshes increases linearly with the number of active RSVP sessions.

The basic routing philosophy on the Internet is "best-effort," which serves most users well enough, but is inadequate for the continuous stream transmission required for video and audio programs over the Internet. With RSVP, users who want to receive a particular Internet "program" (for example, a television program broadcast over the Internet) can reserve bandwidth through the Internet in advance of the program, and are able to receive the program at a higher data rate, and in a more dependable data flow than usual. When the program starts, it is multicast to those specific users who have reserved routing priority in advance.

For example, in the case where a particular video program is to be multicast at a certain time and date. A user desiring to receive the broadcast sends an RSVP request before the broadcast to allocate sufficient bandwidth and priority of packetscheduling for the program. The request goes to the nearest Internet gateway with an RSVP server. The server determines whether sufficient bandwidth remains to be reserved without affecting earlier reservations. The gateway then forwards the reservation to the next gateway toward the destination (or source of multicast). In this manner, the reservation is ensured all the way to the destination.

Other QoS protocols distinguish between various application protocols, e.g. Hypertext Transfer Protocol (HTTP) for Internet browsing vs. File Transfer Protocol (FTP) for file downloading. Various applications have different communication needs. For example, Internet browsing preferably involves interactive response, while file transfer does not. Therefore, some QoS protocols provide HTTP data with faster delivery. Existing QoS protocols do not provide the network with the ability to optimize whatever capacity is available according to user preferences, such as a reduction in the volume of data to be transferred, but only request better performance for a specific transfer at the expense of other transfers. A rich media stream is all the more susceptible to network conditions such as the dynamic bandwidth issue described hereinabove, which may, for example, force interruption of one type of media such as video. Also, not every terminal can receive all types of media content (a fixed condition, as opposed to the dynamic conditions of network congestion). For example, today's pre-3G cellphones cannot show video. All known control protocols deal with specific communications media types only (video only, audio only, etc.). None is dealing with the content within the stream.

In the hierarchy of communications protocols media type is a lower communication layer than media content on the Open Systems Interconnect (OSI), 7 layer model of communication. Media Access Control (MAC) differs for various physical media, that is, media type. MAC is a sublayer of layer 2, the data link layer. Media content is part of the presentation layer, the second highest layer (layer 6), and performs functions such as text compression code or format conversion to try to smooth out differences between hosts. The application layer, the top (7th) layer of the OSImodel, is concerned with the user's view of the network. This layer handles issues like network transparency, resource allocation and problem partitioning. RSVP is a transport protocol, layer 4. The transport layer determines how to use the network layer to provide a virtual error-free, point to point connection so that host A can send messages to host B and they arrive un-corrupted and in the correct order. When some information is omitted to avoid a general garbling of the overall content, it is preferable for the user to decide what to omit, and to decide based on content and not on technical parameters such as the media protocol (HTTP, FTP, etc). Furthermore, a decision to omit some information, when desirable, provides added value both to the network and to the user.

The network can be proactive and send only partial information when appropriate, while the user is more likely to receive only what is really needed. Content based control protocol assumes that rich media can be tagged according to content. Accordingly, the Motion Picture Experts Group (MPEG) has set a target to provide a media tagging standard, based on content. The MPEG group has suggested that the newest standard being developed, the MPEG-7, should call for technical suggestions for a standard that resembles the Rich Media Mapping Protocol (RMMP) described hereinbelow. Presently, MPEG-7 is being discussed as including a new supporting layer for content description in preparation for large volume rich media message service. Mobile requirements are not covered under MPEG-7, although the mobile (cellphone and/or personal computer) handsets are becoming the leading manifestation of rich media terminals.

It would therefore be desirable to provide a method and a system for enabling the network to transmit a lower volume of information when appropriate and different users may choose to omit extraneous information in different circumstances. Existing QoS protocols do not use any information about the content of the media being transferred and therefore miss an opportunity for user decision-making based on preferences for received information.

SUMMARY OF THE INVENTION

Accordingly, it is a principal object of the present invention to overcome the limitations of existing transmission protocols and to provide an improved method and system for user control of the content of received and transmitted electronic information.

It is a further object of some aspects of the present invention to provide an improved method and system for a protocol for user control of the content of received and/or transmitted electronic information.

In accordance with a preferred method of the present invention ,there is provided a method for sending and receiving a plurality of content forms of electronic information, comprising the steps of adapting a transmission content format for tagging at least one of the content forms; storing at least one user reception profile for defining and prioritizing said plurality of content forms; measuring the quality of communications conditions associated with at least one of the group including: network congestion, transmission quality, and reception quality; and notifying the sender, if said measured quality of communications conditions falls below a predetermined level, to adjust the tagged transmission format and send only those content forms defined in said at least one stored user reception profile.

In some preferred embodiments of the present invention, a receiving terminal is encoded with a table of preset reception profiles according to user preferences, for example: talking head, target body, voice only, white board only, and scenery In a preferred embodiment, a streaming server normally sends a rich media stream comprising a plurality of content forms, for example, audio, video, text, images, etc. The diversity of content known in the art is encapsulated by the term "wallpaper video". Wallpaper video is a term denoting generic visuals, graphics, or other stills or tape that can be used as introductions or backgrounds, or that can be inserted in a window on the screen. Wallpaper video is commonly used in televised newscasts.

A Content Based Control Channel (CBCC) created by a Content Based Control Protocol (CBCP) allows the user at various junctures of media reception to change his reception profile. The receiving terminal notifies the streaming server which content to send during periods of communications problems. Preferably, the CBCC informs the streaming server which form, or forms, of content to send.

A preferred embodiment includes a corresponding protocol, Rich Media Mapping Protocol (RMMP). Such a protocol enables "intelligent" navigation within rich media files (video, audio, fax, voice mail etc). Thus, by introducing the separation of content and headers, existing protocols can be adapted to such a separation. Thus, RMMP is the application of new protocols to have separate headers for each content in the media streams. RMMP is the rich media equivalent of HTTP. RMMP is preferably accompanied by a Rich Media Markup Language (RMML) which corresponds to HTML.

Furthermore, RMML achieves for mobile devices what the Wireless Markup Language (WML) and the Handheld Markup Language (HDML) achieve for handheld devices.

In accordance with another preferred embodiment of the present invention, there is provided a system for sending and receiving electronic information having a plurality of content forms over an electronic network, according to a plurality of user electronic profiles, comprising transmission means operable to adapt a transmission content format for tagging at least one of the content forms; memory means for storing at least one user reception profile for defining and prioritizing said plurality of content forms; measuring the quality of communications conditions associated with at least one of the group including network congestion; transmission quality; reception quality; and receiving means operable to notify said transmission means, if said measured quality of communications conditions falls below a predetermined level, to adjust the tagged transmission format and send only those content forms defined in said at least one stored user reception profile Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which:

FIG. 6 is a table illustrating an example of a user profile.

DETAILED DESCRIPTION OF THE PREFERRED EMBODIMENTS

Figure 1:
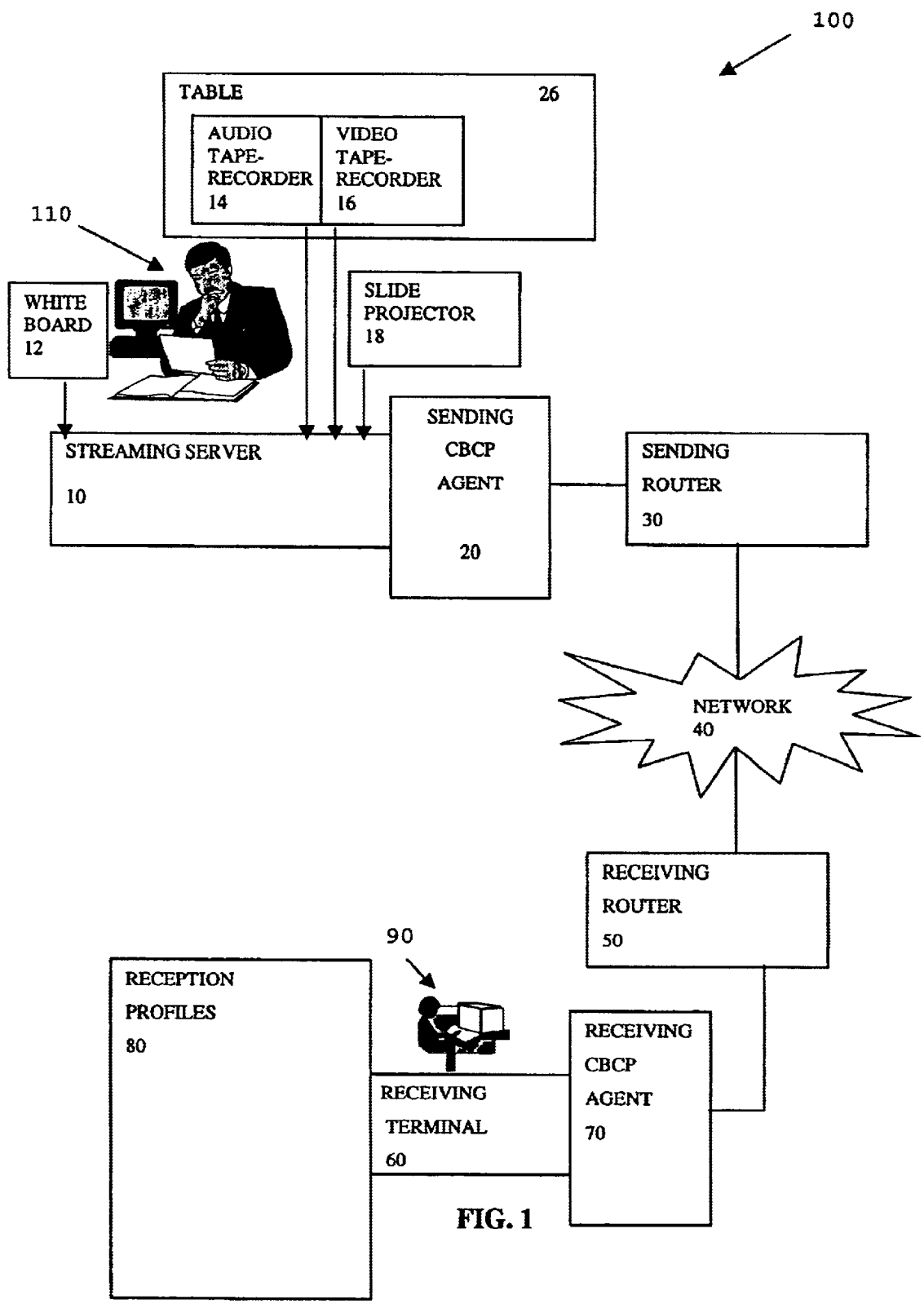
FIG. 1 is a block diagram of a system for controlling the content of a rich media stream in accordance with a preferred embodiment of the present invention.

Reference is now made to FIG. 1, which is a block diagram of a system 100 for controlling the content of a rich media stream in accordance with an embodiment of the present invention. A user 90 uses a receiving terminal 60, which is encoded with an electronic table of predetermined reception profiles 80 which express the preferences of different users for received information. One user 90 has special interest in the face of the speaker, but is willing to relinquish the scenery behind the speaker. Another user 90 (not shown), while driving, wants to receive only the voice information contained within a combined audiovisual message, although his terminal can receive audio and video. Yet another user 90 (not shown) wants to see only the white board and chooses to omit the face of the speaker.

The receiving terminal 60 and a streaming server 10 (present embodiment of a sending server), are both connected to a network 40, e.g., the Internet. The receiving terminal 60 notifies the streaming server 10 of the content preferred in case of network congestion, using the reception profiles 80 to specify content. This information is provided to streaming server 10 according to a Content Based Control Protocol (CBCP). The reception profile 80 can be changed during the media flow, thus enabling real time flow control. The receiving terminal 60 can communicate with streaming server 10 during conversation on two-way communication. Thus, the receiving terminal 60 and the streaming server 10 are able to support sending information based on CBCP as well as receiving information based on multiple reception profiles 80 that are part of CBCP.

The receiving terminal 60 is connected to a receiving CBCP agent 70 which connects to a receiving router 50. A streaming server 10 is connected to a sending CBCP agent 20, which, in turn, connects to a sending router 30. Both the receiving CBCP agent 70 and the sending CBCP agent 20 measure the quality of network 40 conditions. The sending router 30 and the receiving router 50 both recognize CBCP packets and provide them with priority, as it is in the network interest to pass the CBCP "packets" as fast as possible to avoid network congestion. A packet is a unit of data sent across a network, usually at the application layer level of the seven layer OSI protocol stack. The streaming server (sending server) 10 measures the quality of the network 40 based on lost packets or re-send requests or other criteria that CBCP may include. When the network 40 is congested, or other low quality parameters are detected, the streaming server 10 automatically sends only required information based on the reception profiles 80. The receiving terminal 60 is able to specify use of the reception profiles 80 for network congestion only, or alternatively, at all times.

For example, if a user is driving a car, the user normally would always prefer to receive only audio information. However, if a user is watching a 3G cellular handset as a passenger in a train and the train gets into a low signal reception area, the user may prefer to omit some video information and receive only smooth audio. If some video is not omitted, the reception is reduced to almost totally incomprehensible audio and video cuts or segments, which are interdependent, because of the required synchronization between the audio and video.

The situation illustrated by system 100 is an "authoring" system which typically includes such components as microphones and cameras for capturing sound and visual images. A user (lecturer) 110 is sitting at a table 26 and reading a lecture. After a while, he goes to a white board 12 and draws a graph. Then, user/lecturer 110 goes back to the table and activates an audio tape recorder 14 which includes a microphone (not shown). The user (lecturer) 110 plays some sounds of wild animals using the audio tape recorder 14, and when finished, the user (lecturer) 110 activates a video tape recorder 16 which includes a video camera (not shown) showing wildlife in a jungle. Finally, the user (lecturer) 110 shows a slide on slide projector 18 and talks about it. The reception profile 80 of the user (student) 90 specifies White Board only. The whole lecture can be described as a multi media file, or a stream of various media, which makes it possible to alter the reception of the lecture by emphasizing one medium by de-emphasizing or screening out of another medium.

The present invention allows preparation of a header that describes the multi media content. The header for the example is detailed in Table I according to the following definitions:

SEGMENT'S NAME—describes the content of the multimedia time segment;

MEDIA TYPE—nature of the segment: audio, (motion) video or (still) image;

MEDIA FORMAT—the way media is presented, e.g., MPEG2 format or MPEG4 format, etc.

CONTENT TAGS—language element descriptor, or markup, used to mark the rich media according to content. For example, there is a distinction between "group of people" and "scenery." The user 90 may specify to screen out the scenery; and TIME—synchronization is important and time marks the beginning and end of segments which can be simultaneous, for example, such as the audio/video of wild animals which both begin at 0:05:00 and both end at 0:10:00. Also the slide image and accompanying audio explanation by the lecturer both begin at 0:20:00 and end at 0:25:00. Multiple audio simultaneous with multiple video is also known in the art.

FIG. 6 is a Table illustrating the header of the content that the user 90 is about to receive. The header is transmitted separately from the content. The header is examined by the sending CBCP agent 20. According to the header, and the reception profile 80 that the user has set, sending CBCP Agent 20 notifies the streaming server 10 regarding the choice of the media and content to be sent by streaming server 10.

The header is transmitted in the form of embedded tags so that users (students) 90, in a closed-circuit, remote, video conference, for example, are individually able to have their reception profiles 80 automatically implemented, or alternatively, are able to manually menu-select a reception profile 80 on the receiving terminals 60.

MPEG-4 is a video compression standard featuring synthesis of speech and video. MP3 is a digital audio compression algorithm that achieves a compression factor of about twelve, while preserving sound quality by optimizing the compression according to the range of sound that people can actually hear. MP3 files can be streamed, i.e., played in real-time. Graphics Interchange Format (GIF) is a standard for digitized compressed images.

Figure 2:
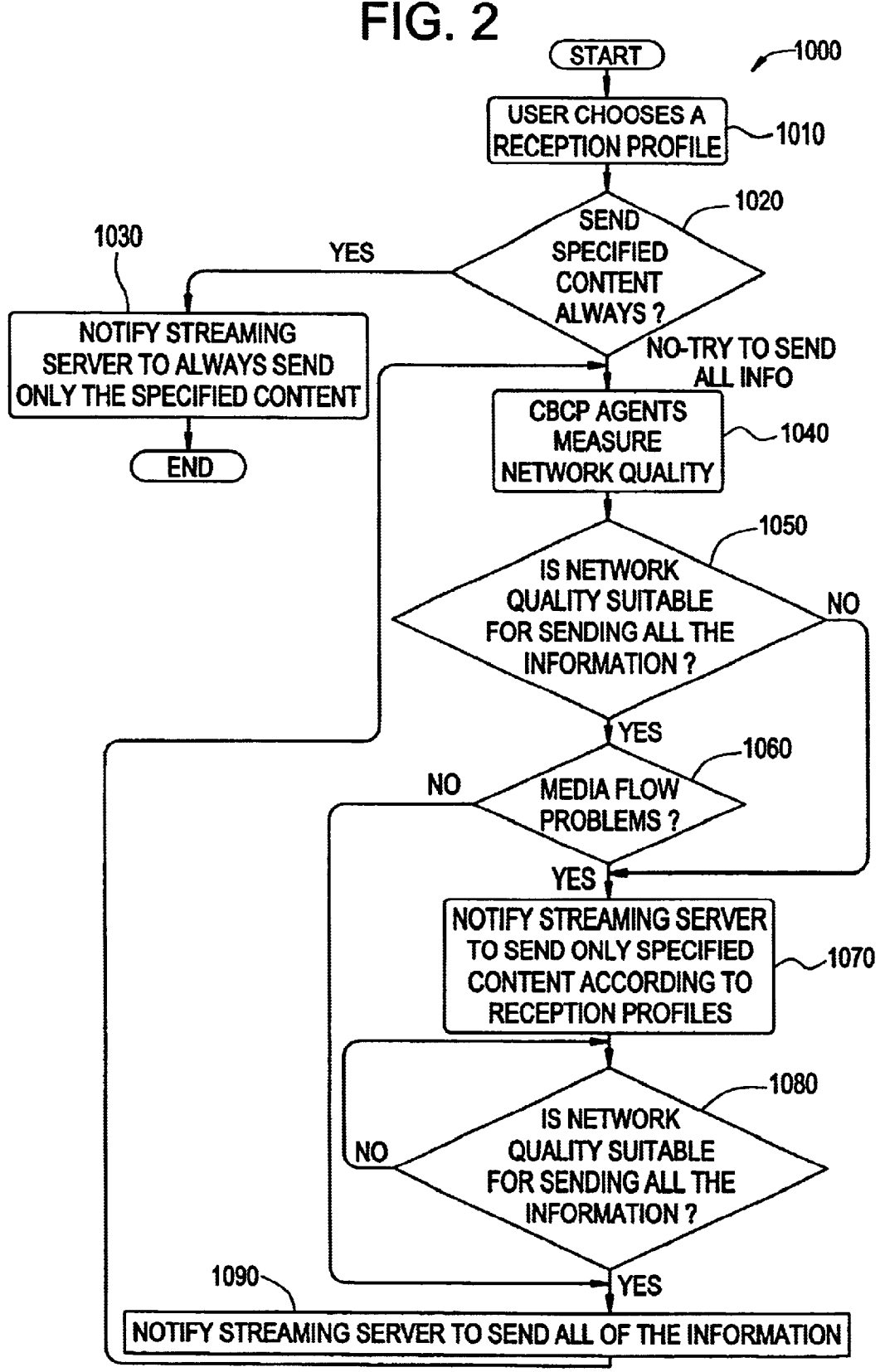
FIG. 2 is a flow chart illustrating a process of controlling the content of a rich media stream in accordance with a preferred embodiment of the present invention.

FIG. 2 is a flow chart 1000 illustrating the method of controlling the content of a rich media stream in accordance with an embodiment of the present invention. The user 90 chooses a reception profile 80 (step 1010) according anticipated conditions and provides reception profile 80 to the receiving terminal 60 accordingly. Where no reception profile 80 is defined by user 90, all information is sent from the streaming server 10, with no omission. The reception profile 80 may include a directive to send only specified content always (i.e., at all times) in step 1020, and receiving terminal 60 notifies the streaming server 10 to always send only the specified content (step 1030). When the user 90 chooses a reception profile in step 1010, the streaming server 10 is directed to send less information in the case of a communication problem, or even when there is no communication problem, i.e., there may be time periods when the user 90 prefers to be sent only specified content always (step 1020).

When the user 90 has chosen to receive partial information during periods of poor network quality conditions, the sending CBCP agent 20 and receiving CBCP agent 70 measure network 40 quality (step 1040) to determine whether network quality is suitable for sending all the information (step 1050). The sending CBCP agent 20 and the receiving CBCP agent 70 also check whether there are any media flow problems 1060. This double checking assures a response in the event of any streaming problems, even if the criteria that the system uses to measure quality of network did not indicate any problems. In the case that poor network conditions are detected (step 1050) and/or media flow is interrupted (step 1060), the streaming server 10 sends only the specified information according to the reception profile 80 (step 1070). Nevertheless, the sending CBCP agent 20 and the receiving CBCP agent 70 continue to measure the quality of the network 40 (step 1080) and when these conditions are improved, the streaming server 10 is notified and is able to send all the information again (step 1090).

FIG. 6 illustrates Table I of the header for a closed-circuit transmission of a lecture to remote the user (student) 90. The user (student) 90 can choose the WHITE BOARD profile on reception terminal 60. Therefore, the system can omit the sending of TALKING HEAD video because the user (student) 90 is interested only in what is being drawn on the white board.

Alternatively, the function of the user (lecturer) 110 can be provided automatically by broadcasting as opposed to a closed-circuit television transmission. Also, the audio tape recorder 14 and the video tape recorder 16 are not required for the more common embodiment of streaming audio and/or video, as cited in examples hereinbelow.

Figure 3:
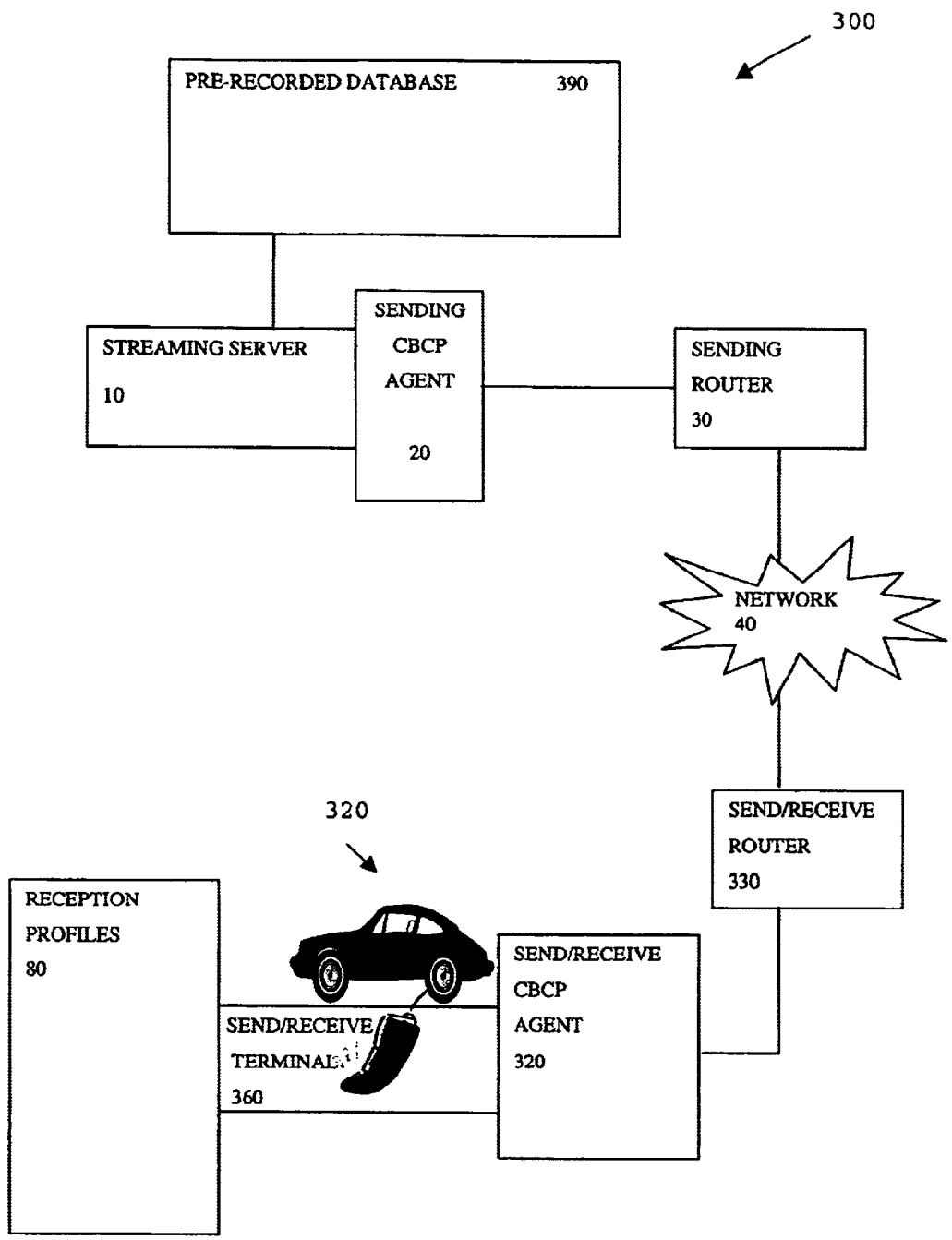
FIG. 3, is a schematic illustration of another scenario of a system for controlling the content of a rich media stream in accordance with a preferred embodiment of the present invention.

FIG. 3 is a schematic illustration of another scenario of a system 300 for controlling the content of a rich media stream in accordance with a preferred embodiment of the present invention. Again, the user 90 has pre-defined some preferences in a reception profile 80. The receiving terminal 60 of FIG. 1 is now a send/receive terminal 360 in the form of a 3G cellphone with some personal computer capabilities, as well. Accordingly, the receiving CBCP agent 70 of FIG. 1 is now a send/receive CBCP agent 320. Further, the receiving router 50 of FIG. 1 is now a send/receive routers 330. The user 90 receives rich streaming media content from a pre-recorded database 390. When the user 90 enters his automobile 362 and is receiving an Internet radio broadcast of a recorded music CD, for example, user 90 may proactively select elements of the content. The user 90 may be receiving voice and/or music audio, and may want to select one or more of a number of voices, and/or one or more of a number of instruments. Thus, the selection of preferences may be proactive. In other words, there may not be a problem with transmitting all the content, but the user 90 may want to receive, or set the volume levels of, selected content for reasons of preferred interest.

Figure 4:
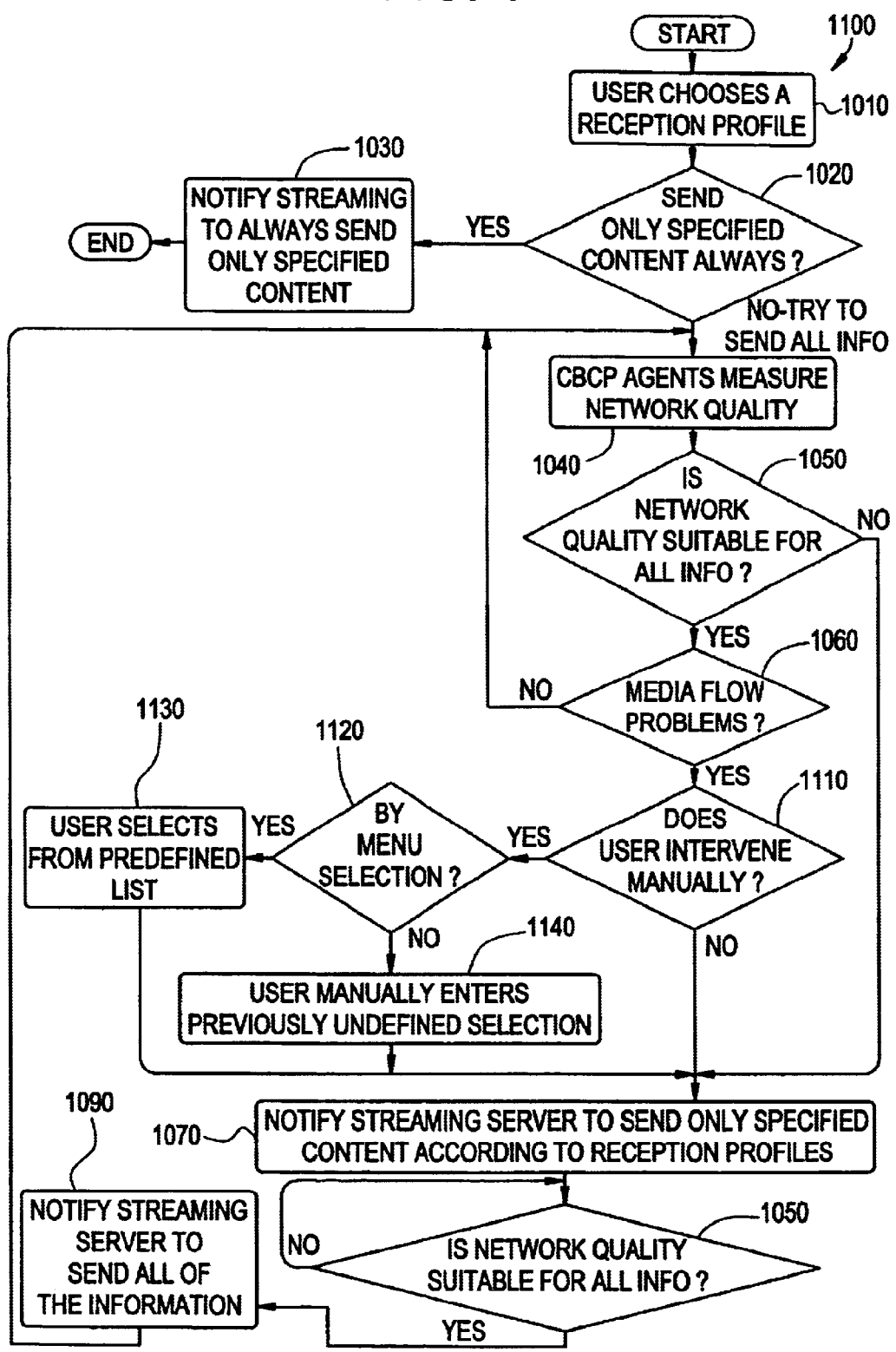
FIG. 4 is an expanded flow chart that schematically illustrates the process of controlling the content of a rich media stream in accordance with a preferred embodiment of the present invention.

FIG. 4 is an expanded flow chart 1100 that schematically illustrates the process of controlling the content of a rich media stream in accordance with a preferred embodiment of the present invention. If there are media flow problems (step 1060), the user 90 has the option in the present scenario to intervene manually (step 1110). In the case of manual intervention, the user 90 has a further option to intervene by menu selection (step 1120), in which case the user 90 selects from a predefined list (step 1130). If intervention is not by menu selection, the user 90 may manually enter a previously undefined selection.

Only a limited range of detail can be built into the reception profile 80, with a very general degree of pre-defined content. For example, the user 90 may be watching video with five or ten talking heads, but may prefer transmission of only one or two of the heads. Again, the selection of preferences may be proactive. That is, there may be no problem with transmitting all the content, but the user 90 may want to receive selected content for reasons of interest, or because of an aerial search process involving some form of detective work or military reconnaissance, for example. The tagging process can be realtime and interactive. Menu selection (step 1120) reflects the type of options described herein, in general, but function keys on the receiving terminal 60, or, alternatively, the send/receive terminal 360 described hereinbelow, can be set up to program "on the spot" designated numbers for talking heads or "mixed" audio tracks. Mixing, for motion picture sound tracks and recorded music, means to combine, blend, edit, etc. the components of a soundtrack. At a more general content level, the dialogue and sound effects are mixed for a motion picture.

In the production of an audiovisual advertisement, as well as for motion pictures, the video is frequently with mixed the voices as "voice-over" (VO). Voiceover may be the sound of an unseen narrator on a TV program or film, or a reading by a TV announcer while a videotape is shown. Voice-over credits (V.O.C.) are audio identifications of sponsors, cast, or other credits, such as at the beginning or end of a TV program. The TV voice-over story, in which a newscaster reports while a tape is shown, is very common, as are a string of rapid-fire disclaimers. By recording voice separately, actors are able to concentrate on the nuances of the dialog, and conversely for the visual affect. For animation mixed with sound the cartoons are always overlaid with separately recorded audio.

Many of the most advanced techniques of content differentiation originated in, and are known in the field of television news broadcasting, and, indeed, "narrowcasting". Narrowcasting is using a broadcast medium to appeal to audiences with special interests. Transmitting a radio or television program to a selected audience, for example, people who have paid for cable television service, is the essence of the cable television business. For a more specific example, the "All Knitting Station" would be a narrowcast, because it appeals to an audience with a specific interest. Once content is tagged, the user 90 can proactively manually enter a previously undefined selection (step 1140) to direct the streaming server 10 to, for example, zoom in closer on the user (lecturer) 110, in the case of a closed-circuit telecast. For the case of a broadcast news program, the user 90 may be one of many users, for example, to manually register a "request" for an over-the-shoulder shot (OSS): a camera shot made from behind a performer, with the camera focused on the spot at which the performer is looking. The television news producer in the control room can determine at what point sufficient requests have been received to warrant compliance. Alternatively, upon receiving a predefined number of requests the streaming server 10 may automatically comply with the requests. Such compliance can also be segmented with multiple versions being relayed to groups of users 90 registering a variety of requests.

Figure 5:
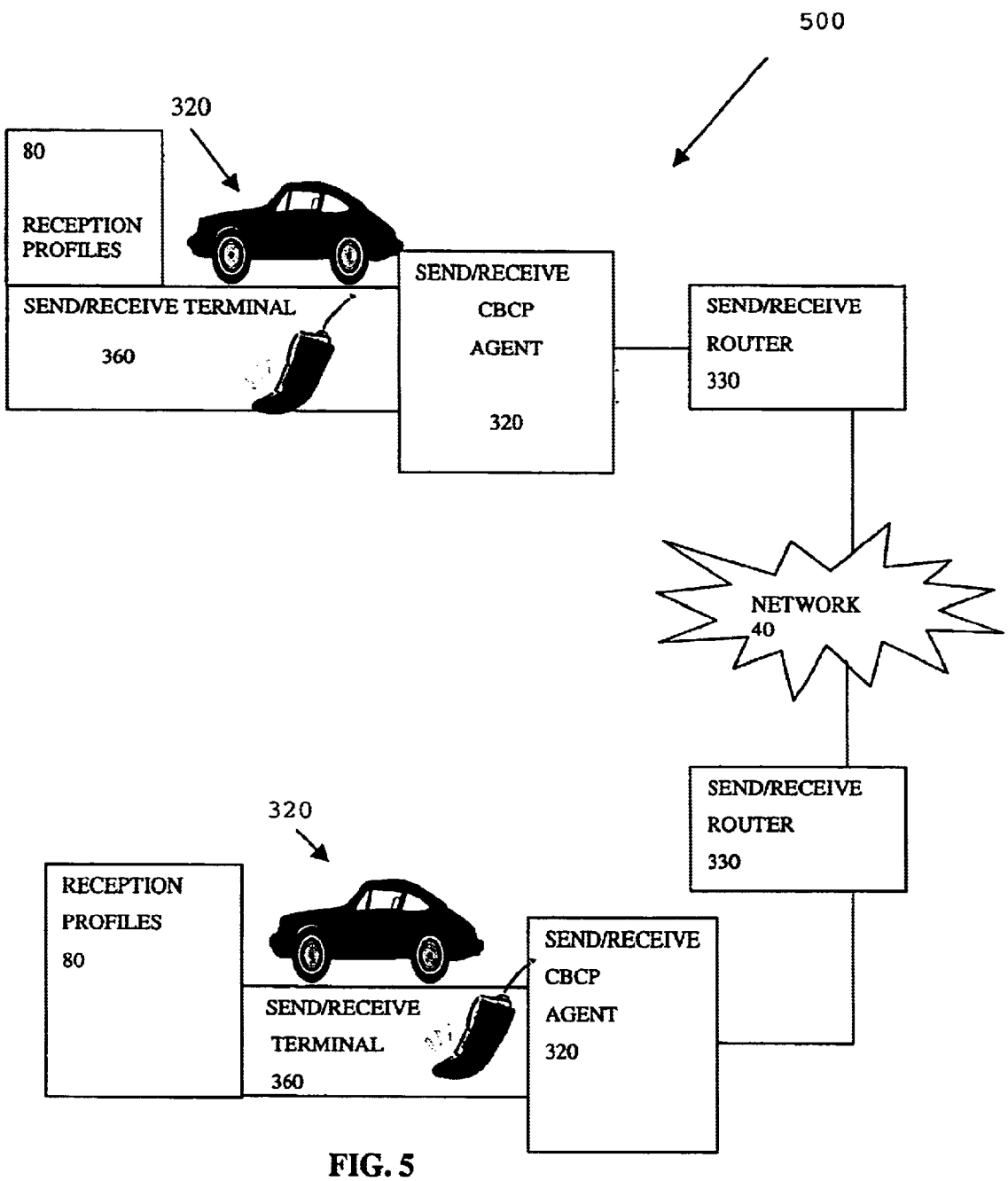
FIG. 5 is a schematic illustration of yet another scenario of a system 500 for controlling the content of a rich media stream in accordance with a preferred embodiment of the present invention.

In FIG. 5, there is shown a block diagram illustrating another scenario of a system 500 for controlling the content of a rich media stream in accordance with a preferred embodiment of the present invention. Both terminals are now send/receive terminals 360 in the form of a 3G cellphone. Accordingly, both CBCP agents are now send/receive CBCP agents 320. Further, both routers are now send/receive routers 330. Users 90 are communicating, the problem they are having is affecting both directions, so both sides need to prioritize according to the RMMP. For example, network congestion is operating in both directions, and users 90 are both talking on cellular phones with video streaming, so both users 90 are having problems with the video streaming.

Reduced transmission for 2-way cellphone communication preferences include text-only message transmission, as an alternative to voice, which is a form of cellphone communication known in the art. Cellphone users occasionally prefer to not have their cellphones ring, for example, when attending a business meeting, in a class, in a library, or at a theater. Another form of reduced transmission for 2-way vehicular cellphone communication is a global positioning system (GPS), which enables the location of the other driver to be received when voice contact is intermittent. Transmission of the location coordinates is sufficient. Software on the receiving side can translate the coordinates into a streetmap or roadmap position on the receiver screen and/or an audio transcription for the driver when he is not able to look at the screen. Even substantially intermittent transmission of location coordinates is sufficient to keep track of the other driver, for example when the receiving driver is giving the sending driver directions. The mobile cellphone user may be using any other form of transportation, such as train, plane, boat, elevator or any other means.

It will be appreciated that the preferred embodiments described above are cited by way of example, and that the present invention is not limited to what has been particularly shown and described herein-above. Rather, the scope of the present invention, as defined by appended claims, includes both combinations and sub-combinations of the various features described hereinabove, as well as variations and modifications thereof which would occur to persons skilled in the art upon reading the foregoing description, and which are not disclosed in the prior art.

What is claimed is:

1. A method for transmitting a media stream comprising a plurality of parts corresponding to different content forms of electronic information from a sender to a receiving terminal via a network, the method comprising the steps of:

adapting a transmission content format by embedding tags in data packet headers associated with said content forms in order to permit a user to select at least one of the content forms;

selecting and storing at said receiving terminal at least one reception profile of a user of said receiving terminal, said reception profile defining and prioritizing said plurality of content forms;

transmitting said reception profile from said receiving terminal to said sender; measuring the quality of communications conditions associated with at least one of network congestion, transmission quality, and reception quality; and notifying the sender, if said measured quality of communications conditions falls below a predetermined level, to adjust the transmission format and send only those parts of said media stream corresponding to said content forms defined in said user reception profile.

2. The method according to claim 1, wherein said operation of notifying the sender comprises automatically notifying the sender without requiring action by the user.

3. The method according to claim 1, wherein said operation of notifying the sender comprises notifying the sender in response to manual intervention by said user.

4. The method according to claim 1, wherein said tags embedded in said data packet headers indicate a media type, a media format and said content form associated with a data packet of said media stream.

5. The method according to claim 1, wherein said user reception profile prioritizes said plurality of content forms by specifying at least one content forms not be sent at times of network congestion in order to reduce said network congestion.

6. A method for adapting a transmission content format for transmitting a media stream comprising a plurality of parts corresponding to a plurality of different content forms comprising embedding tags in a data packet header which are each associated with one of said content forms, to allow a user to receive only those parts of said media stream corresponding to said content forms specified by a set of user preferences.

7. The method of claim 6, further comprising storing said user preferences for prioritizing the reception of said content forms.

8. The method of claim 7, further comprising responding to said stored user preferences during periods of poor communications conditions.

9. The method of claim 7, further comprising responding to said stored user preferences according to the interests of said receiver.

10. The method of claim 6, further comprising:

receiving said user preferences from said user in interactive fashion; and responding to said received user preferences by adapting said set of user preferences accordingly.

11. The method according to claim 6, wherein said tags embedded in said data packet headers indicate a media type, a media format and said content form associated with a data packet of said media stream.

12. The method according to claim 6, wherein each user specifies at least one content form to omit at times of network congestion in order to reduce said network congestion.

13. A system for sending and receiving a media stream comprising a plurality of parts corresponding to different content forms over an electronic network, according to a plurality of user electronic profiles, comprising:

a transmission unit operable to adapt a transmission content format for tagging at least one of the content forms by embedding tags in a data packet header associated with said at least one of said content forms;

a memory for storing at least one user reception profile for defining and prioritizing said plurality of content forms;

a communications monitor for detecting the quality of communications conditions associated with at least one of network congestion, transmission quality; and reception quality; and a receiving unit operable to notify said transmission means, if said measured quality of communications conditions falls below a predetermined level, to adjust the transmission format to send only those parts of said media stream corresponding to said content forms defined in said stored user reception profile.

14. A system according to claim 13, wherein said transmission unit comprises a sending terminal.

15. A system according to claim 14, wherein said sending terminal comprises a streaming server.

16. A system according to claim 13, wherein said receiving unit comprises a send/receive terminal.

17. A system according to claim 13, wherein said transmission unit comprises a send/receive terminal.

18. A system according to claim 13, wherein said receiving unit comprises a mobile cellular telephone.

19. A system according to claim 13, wherein said receiving unit comprises a personal computer.

20. A system according to claim 13, wherein said receiving unit comprises a portable personal computer.

21. A system according to claim 13, wherein said receiving unit comprises a mobile cellular telephone.

22. A system according to claim 13, wherein said receiving unit comprises a mobile cellular telephone coupled to a personal computer.

23. A system according to claim 13, wherein the electronic network comprises the Internet.

24. A system according to claim 13, wherein the electronic network comprises an intranet.

25. A system according to claim 13, wherein the electronic network is a closed-circuit television system.

26. A system according to claim 13, wherein the electronic network comprises a cable television network.

27. A system according to claim 13, wherein the electronic network comprinses a wired telephone-based network.

28. A system according to claim 13, wherein said transmission unit operates to adapt said transmission content format using a content-based control protocol which communicates via a content-based control channel.

29. A system according to claim 28, wherein said transmission content format is navigated by a rich media mapping protocol.

30. A system according to claim 29, wherein said transmission content format is navigated by a rich media mapping language for embedding the content with tags.

31. The system according to claim 13, wherein said tags embedded in said data packet headers indicate a media type, a media format and said content form associated with a data packet of said media stream.

32. The system according to claim 13, wherein each of said user electronic profiles specifies at least one content form to omit at times of network congestion in order to reduce said network congestion.

33. An apparatus for sending and receiving a plurality of packets forming a media stream comprising a plurality of parts corresponding to different content forms, over an electronic network, according to a plurality of user electronic profiles, comprising:

a streaming server operable to adapt a transmission content format for tagging at least one of said content forms by embedding tags in a data packet header associated. with said at least one of said content forms;

a sending content-based control protocol agent to detect the quality of communications conditions associated with network congestion and transmission quality, and to notify said streaming server if said conditions fall below a predetermined level, to adjust the transmission format to send only those parts of the media stream corresponding to said content forms defined in said profiles;

a sending router to prioritize the order of sending said plurality of packets of information so as to avoid network congestion;

a receiving router to prioritize the order of receiving said plurality of packets of information so as to avoid network congestion; and a receiving content-based control protocol agent to detect the quality of communications conditions associated with network congestion and reception quality, and to notify said streaming server if said conditions fall below a predetermined level, to adjust the transmission format to send only those parts of the media stream corresponding to said content forms defined in said profiles.

34. The apparatus of claim 33, wherein said server and said sending agent comprise one device.

35. The apparatus of claim 33, wherein said sending agent and said sending router comprise one device.

36. The apparatus of claim 33, wherein said server, said sending agent and said sending router comprise one device.

37. The apparatus of claim 33, wherein said server and said receiving agent comprise one device.

38. The apparatus of claim 33, wherein said receiving agent and said receiving router comprise one device.

39. The apparatus of claim 33, wherein said server, said receiving agent and said receiving router comprise one device.

40. The apparatus according to claim 33, wherein said tags embedded in said data packet headers indicate a media type, a media format and said content form associated with a data packet of said media stream.

41. The apparatus according to claim 33, wherein each of said user electronic profiles at least one content form to omit at times of network congestion in order to reduce said network congestion.

* * * * *